United States Patent [19]

Syken

[11] Patent Number: 5,020,233
[45] Date of Patent: Jun. 4, 1991

[54] MEASURING INSTRUMENT

[76] Inventor: Jeffrey M. Syken, 211-10 73rd Ave., Apartment 4C, Bayside, N.Y.

[21] Appl. No.: 493,167
[22] Filed: Mar. 14, 1990
[51] Int. Cl.⁵ .......................... B43L 7/10; B43L 7/12
[52] U.S. Cl. ...................................... 33/465; 33/418; 33/456; 33/499
[58] Field of Search ................ 33/465, 452, 455, 456, 33/495, 496, 497, 492, 459, 421, 422, 418, 467, 468, 478

[56] References Cited

U.S. PATENT DOCUMENTS

| | | | |
|---|---|---|---|
| 794,409 | 7/1905 | Irving, Jr. | 33/465 |
| 903,648 | 11/1908 | Wiles | 33/478 |
| 909,023 | 1/1909 | Ratner | 33/478 |
| 1,418,358 | 6/1922 | Bowen | 33/465 |
| 1,919,551 | 7/1933 | Griffin | 33/478 |
| 1,945,987 | 2/1934 | Ware | 33/456 |
| 2,110,636 | 3/1938 | Sharp | |
| 3,096,586 | 7/1963 | Albright et al. | 33/26 |
| 3,343,265 | 9/1967 | Puerta | 33/478 |
| 4,312,133 | 1/1982 | Mina | 33/492 |
| 4,446,627 | 5/1984 | Persson | 33/497 |
| 4,562,649 | 1/1986 | Ciavarella | 33/419 |
| 4,920,658 | 5/1990 | Hele | 33/465 |

FOREIGN PATENT DOCUMENTS 600262  11/1959  Italy ........................................ 33/492

Primary Examiner—William A. Cuchlinski, Jr.
Assistant Examiner—C. W. Fulton
Attorney, Agent, or Firm—Henderson & Sturm

[57] ABSTRACT

The disclosed measuring instrument includes a pair of members arranged together to form a right-angled L and the members having indicia providing linear scales useful in measuring areas in architectural plans and the like. The members are separable at the joint that forms the corner of the L and are further capable of re-connection to each other in end-to-end relationship so as to provide an elongated straight edge. The junction of the members at the corner of the L includes a pivot about which one member may be moved through a 180° range to form an inverted L. In a modification, at least one of the members includes a wing element along one edge and rockable about a separable pivot on an axis parallel to that one edge.

11 Claims, 3 Drawing Sheets

U.S. Patent     June 4, 1991     Sheet 1 of 3     5,020,233
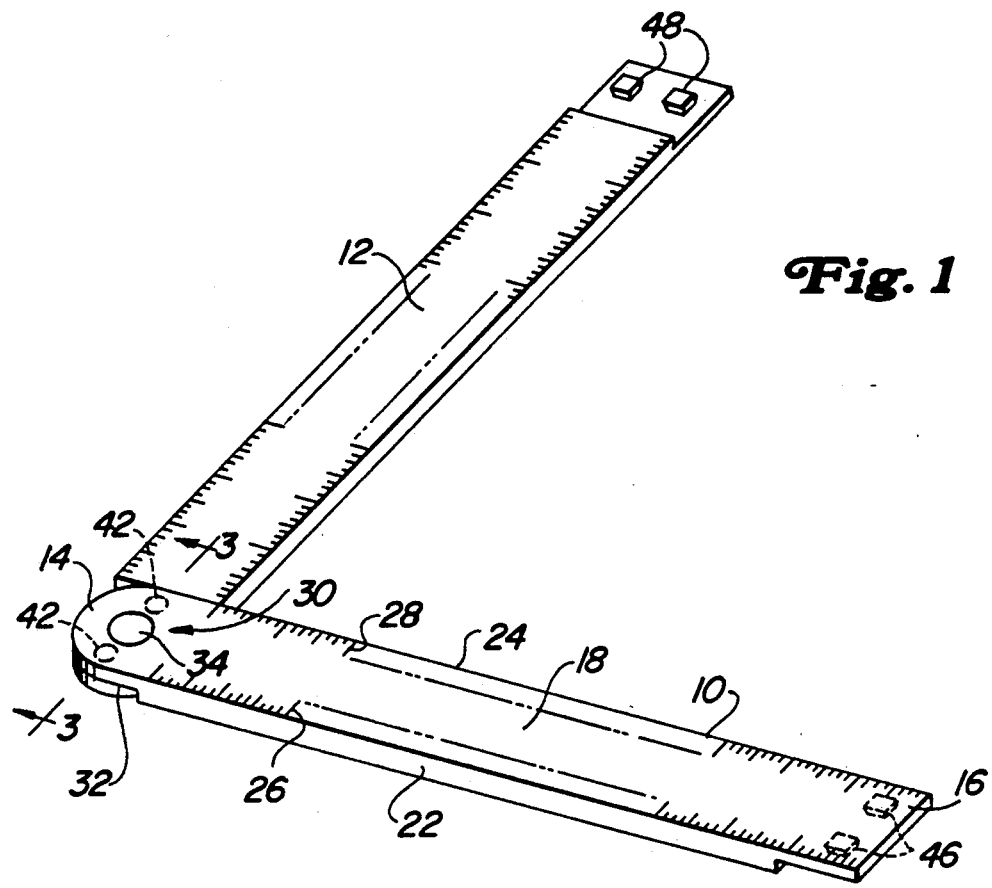
Fig. 1
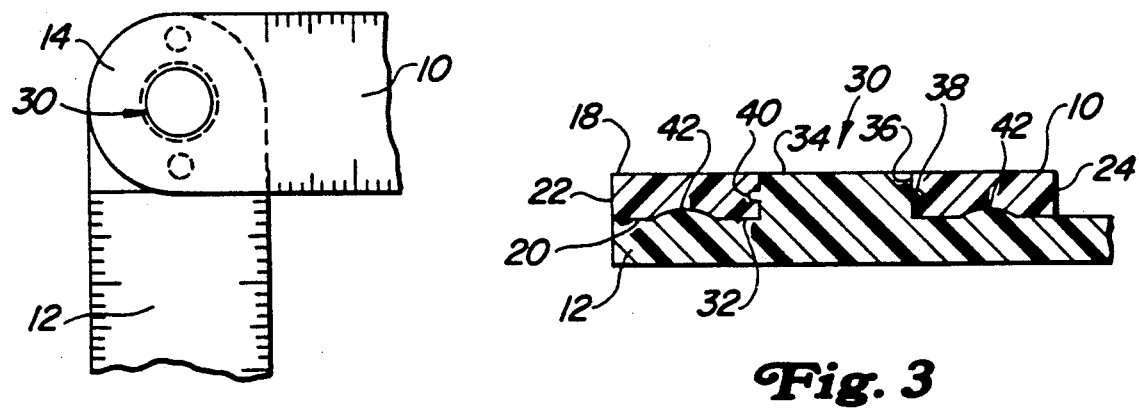
Fig. 2
Fig. 3

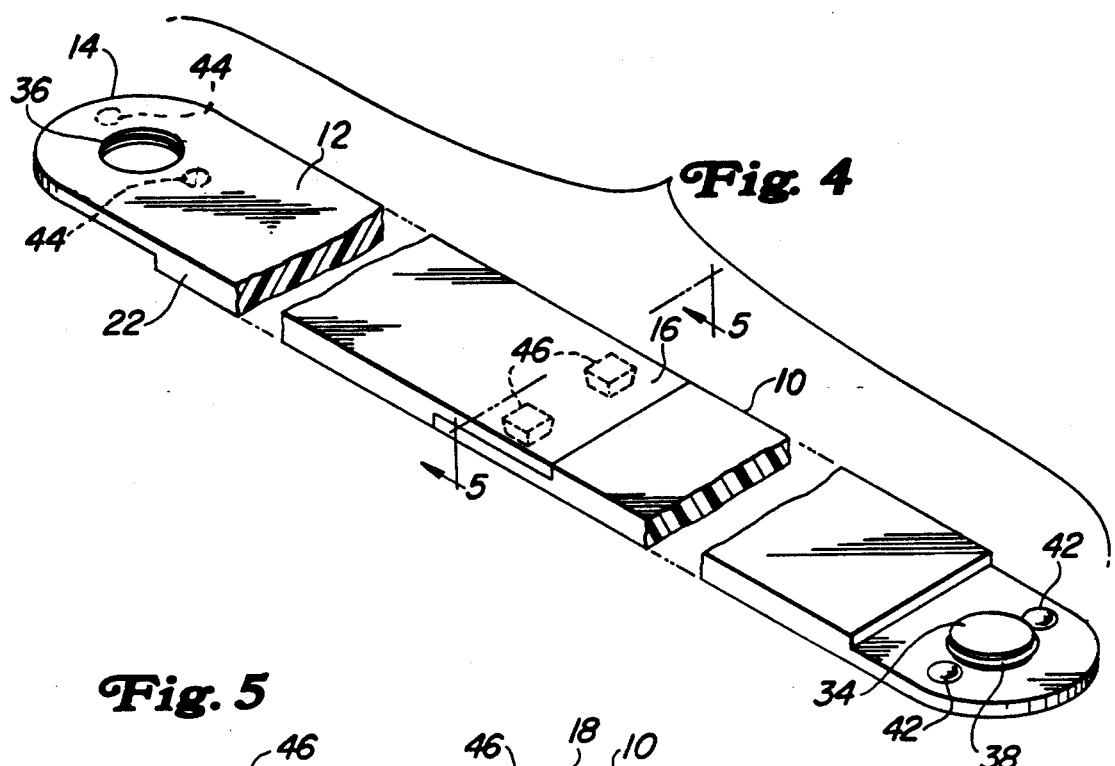
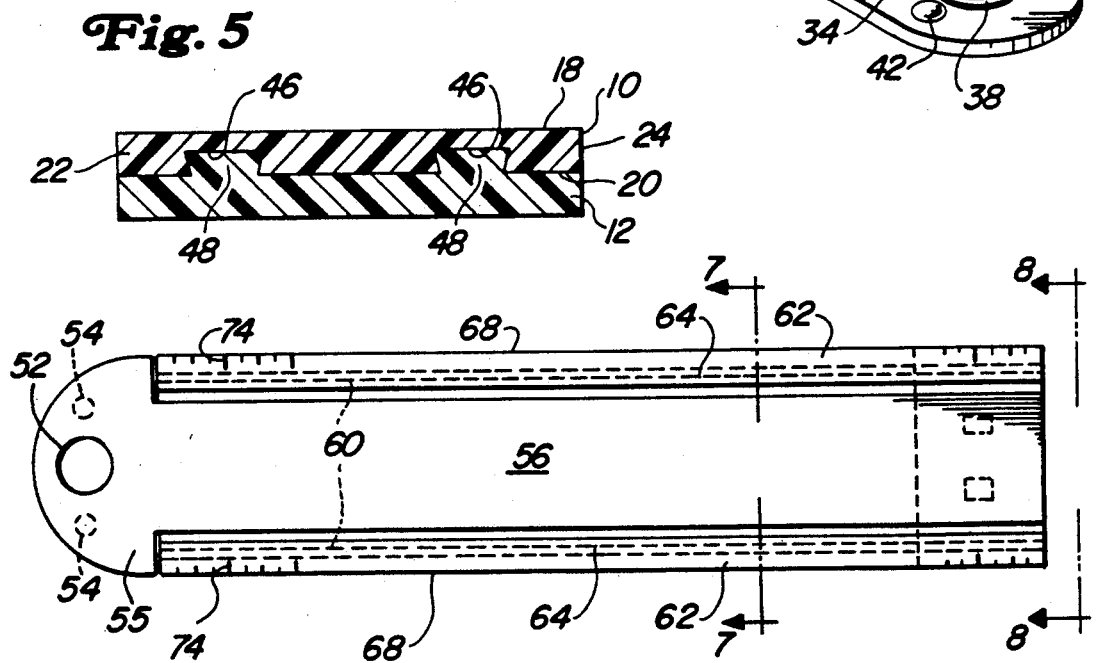

MEASURING INSTRUMENT

BACKGROUND AND SUMMARY OF THE INVENTION

The art is replete with various types of measuring devices, such as carpenter squares, retractable scaled measuring tapes, bevel squares and the like, but none of these enables the speedy accomplishment of measuring "to-scale" plans for quantity survey, lay-out, estimating and like purposes other than the retractable scaled measuring tape. The carpenter square is a fixed L-shaped member, and its versatility is limited. The bevel square lacks a precise means for setting the blades at right angles to each other. The retractable scaled measuring tape is limited to only two scales, usually $\frac{1}{4}''=1'\text{-}0''$ and $150''=1'\text{-}0''$ and only one directional measure, vertical and/or or horizontal can be achieved in a given motion. Like the tape, the architect's scale is mono-directional and is difficult to measure with quickly for quantity take-off purposes even in that configuration, mainly because it holds two scales on each face (i.e., from left to right and right to left) which overlap one another thus making quick measurement confusing and awkward.

The present invention provides a simple, convenient instrument operable in one or more mode(s). A pair of members interconnected to form a right-angled L allows for dual scale measure in a single motion, both vertically and horizontally and also allows for both scales to be readily used, one on the obverse and one on the reverse. The interconnection includes a pivot about which the members may be rotated to form an inverted L, again allowing for two scales to be readily used, one on the obverse and one on the reverse. Thus, in all, in both the "L" and inverted "L" position(s) a total of four scales can be applied in the basic and/or modified design. The pivot is separable to enable the members to be interconnected in end-to-end fashion for achieving an elongated straight edge, which is supplemental to the main purpose of the invention which is dual directional scale measure in one motion. Numerated indicia are provided running in opposing direction to the primary indicia on the scale face accordingly on the appropriate scale face to allow for extended, elongated measure when in the elongated mode. Further features include the provision on the members of indicia representing linear scales of different amplitude; e.g., $\frac{1}{4}''=1'\text{-}0''$, $\frac{1}{8}''=1'\text{-}0''$, $\frac{1}{2}''=1'\text{-}0''$, $\frac{3}{4}''=1'\text{-}0''$ and so forth. In a modified form, at least one edge of one member has an interchangeable longitudinal "wing" with two scale faces, one on the obverse and one on the reverse. This wing pivots about the member which allows for flush contact with the measured surface as well as interchangeability for use of other scales since it is removable.

Further salient features of the invention will appear as the disclosure progresses in connection with a preferred embodiment of the invention.

DESCRIPTION OF THE DRAWINGS

FIG. 1 is a perspective of the instrument in its first mode and forming a right-angled L.

FIG. 2 is a detailed-plan view showing a second mode in which the members form an inverted L about the pivot point.

FIG. 3 is an enlarged section of the pivotal interconnection of the members as seen along the line 3—3 of FIG. 1.

FIG. 4 is a perspective, with portions broken away, of the members interconnected in end-to-end relation and operative in a third mode to provide an elongated straight edge.

FIG. 5 is an enlarged section as seen along the line 5—5 in FIG. 4.

FIG. 6 is a plan view of a modified form of member including longitudinal interchangeable, axial rotating "wings."

DETAILED DESCRIPTION OF A PREFERRED EMBODIMENT OF THE INVENTION

Figure 7:
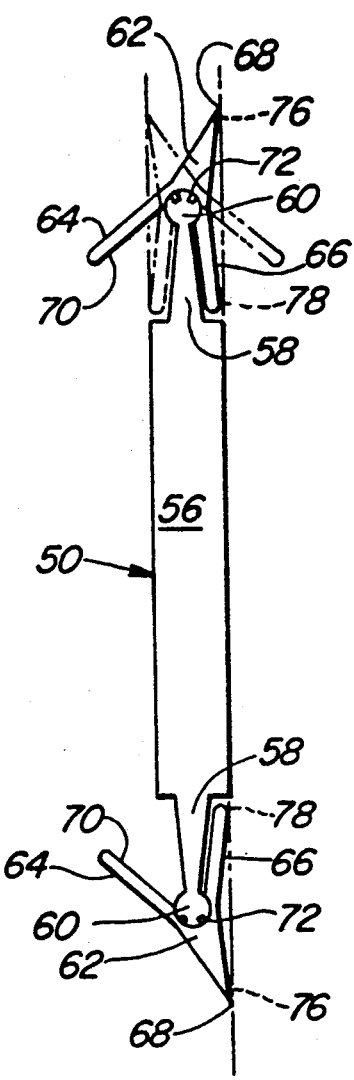
FIG. 7 is an enlarged cross-sectional view of the FIG. 6 structure as seen along the line 7—7 on FIG. 6.

Reference will be had first to FIGS. 1 and 2 for a general description of what is involved. As seen in these Figures, the measuring instrument comprises, essentially, a pair of substantially similar members 10 and 12, each being on the order of, say, ten to twelve inches long and one to one and one-half inches wide and one-eight to one-quarter inch thick. These are, of course, representative dimensions and may be widely varied without sacrificing the advantages of the inventive structure. With particular reference to the member 10, it is seen as being generally rectangular in plan, having opposite ends 14 and 16, top and bottom flat surfaces 18 and 20 and opposite straight sides 22 and 24. Linear measuring indicia 26 and 28, respectively, are provided along the edges 22 and 24. These are shown in representative fashion, since they may take many forms and, by way of example, may be different scales such as found on architectural, engineering and like measuring elements. Scales of different amplitude or degree will appear on the under-side (reverse) of the member, the member being reversible from obverse to reverse conditions to bring a wide selection of scales into play. The members may, if desired, be transparent and the indicia portions opaque, for example. Since the members are similar, except for the essential fact that one member acts as the male and the other as the female, what is said about the member 10 as to ends, sides, surfaces, scales, etc., applies also to the member 12 and, in the interests of clarity and brevity, a detailed repetitive description is omitted.

The members are interconnected at the corner of the L by pivot means 30 on an axis normal to the general plane of the members. The meeting ends of the members are reduced in thickness to afford a lap joint 32 so that the members are essentially coplanar; i.e., in either reverse or obverse position they will lie "flush-to-the-surface" on the drawing or the like being measured or estimated. The pivot comprises an upright circular "button" or "stud" 34 integral with the member 12 and a complementary circular opening 36 in the member 10. The stud has an annular rib 38 which mates with an annular groove 40 within the opening 30 (FIG. 3) for securing the joining of the two members.

The members are preferably formed of any suitable, commercially available material, such as plastic, of a relatively stiff but at least slightly temporarily distortable nature so that, when the members are assembled at the pivot 30, the rib on the stud will be received by and have a light but effective force fit with the groove 40 in the opening 36, thus affording a snap-in/snap-out interconnection so that the members can be manually separated for use in the in-line mode of FIG. 4 to be presently described. The nature of the force fit is such as to enable pivoting of the member 12 from the position or mode shown in FIG. 1 to the mode or position of FIG. 2 wherein an inverted L is achieved by the members. Since it is important that the members bear a right-angled relation to each other in both modes, detent means are provided between the members in the area of the pivot 30 so as to releasably interlock the members. A suitable form of detent means is seen in FIG. 3 as including recesses 42 in the bottom of the end of the member 10 and matching nodes 44 on the associated end of the other member 12. Because of the nature of the material of which the members are formed, as discussed immediately above, the detent force is relatively easily overcome by manual force in changing the positions of the members from the FIG. 1 mode to that of FIG. 2.

Because of the snap-in/snap-out nature of the parts at the pivot 30, the members may be separated and reassembled in a third mode as seen in FIG. 4, wherein the members are arranged in end-to-end fashion to achieve an elongated straight edge. For this purpose another snap-in/snap-out means is employed, taking the form of pockets 46 in the reduced-thickness end 16 of the member 10 and projections 48 at the reduced-thickness end of the member 12. The projections 48 are releasably force-fitted into the pockets 46 to effect the interconnection as seen in FIGS. 4 and 5. The force fit may be relatively easily manually overcome in order to separate the members. Here, as in the case of the pivot 30, representative interconnecting means are shown by way of example and wide variations in details may be indulged without departing from the basic thrust of the invention. This observation applies of course to other details chosen for purposes of disclosure.

Figure 8:
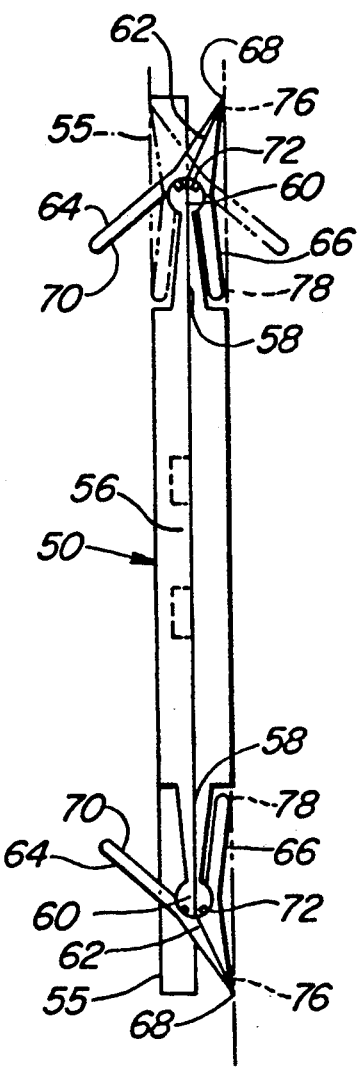
FIG. 8 is an enlarged end view of the FIG. 6 structure as seen along the line 8—8 on FIG. 6.

Reference will now be had to FIGS. 6 and 7 for a disclosure of a modified form of member 50 which may be substituted for the members 10 and 12. This member has one end provided with pivot and detent components 52 and 54, respectively, like those already described, however, in this modified version, the pivot and detents are offset from the centerline of the radius end accordingly to the left of that point to allow for proper alignment of both vertical and horizontal scales when in "L" and/or inverted "L" positions (modes) (refer to FIG. 6). The member has an elongated body 56 from which "arms" 58 extend symmetrically laterally to provide pivots 60 on axes parallel to the length of the member. Each of these pivots allows for mounting an interchangeable, axial-rotating wing element 62. Each wing is of generally V section as seen in elevation or in section in a plane normal to the pivot axes, having top and bottom faces 64 and 66 converging to a relatively narrow edge or "point" 68. Each wing is configured at 70 to enable limited rocking about its pivot to engage flush contact with the measured surface. Detent means 72 is provided to releasably retain the wing in flush-to-surface position. Compare full and dotted-line positions in FIGS. 7 and 8. Note that in the modified form, to allow for elongated measure via detaching the two members and joining them at their ends such as depicted in FIG. 4, the "arms" 58 as well as the wings 62 must be one-half in cross-section as shown in FIG. 8 to allow for complimentary "mating" to occur.

As seen in full lines in FIG. 7, the bottom faces of the wings engage the surface being measured and the top faces slope downwardly to the edge 68 along which indicia are provided. The advantage is that the straight edge along the narrow portion 68 is easier to read relative to the area being measured since it is flush with the surface. Another feature of this phase of the invention is that the top and bottom faces of each wing are slightly concave so that contact with the surface being measured is limited to essentially two contact lines 76 and 78 as distinguished from flat face-to-face contact. The line contact results in cleaner and neater use of the wings, since they, because of their configuration, minimize the pick-up of dirt, etc., from the face of the drawing being measured. Since the wings are symmetrical from top to bottom, they function identically whether the member 50 is in obverse or reverse position.

As will have been seen from the foregoing, the invention provides a simple, low-cost, convenient measuring tool that affords substantial versatility in use because of the several modes of operation. Features in addition to those pointed out will readily occur to those versed in the art, as will many modifications in the preferred embodiments disclosed, all without departure from the spirit and scope of the invention.

I claim:

1. A measuring instrument, comprising: first and second elongated, substantially similar members, each having a generally flat bottom surface, opposite ends and side edges, and each side bearing measuring indicia, said members being arranged in a first mode in the form of a right-angled L with one end of the first member meeting one end of the second member, with the opposite ends of the members free, and with the top and bottom surfaces respectively coplanar, pivot means on an axis normal to the plane of the top surfaces and interconnecting the meeting ends of the members, detent means at said meeting ends for retaining the right-angled relationship of the members, said detent means being releasable in response to manual force to enable pivoting of one member relative to the other through 180° to a second mode in the form of a right-angled inverted L, and the detent means being effect in the second mode for retaining inverted right-angled relationship of the members in which the pivot means is separable to enable third-mode use of the members in coplanar, end-to-end, straight-line fashion with the free ends of the members meeting at a junction, and snap-fit means respectively on said free ends, cooperate to provide a releasable connection at said junction; wherein, in the third mode of use of the members the reoriented top and bottom surfaces of the members are coplanar.

2. A measuring instrument according to claim 1, in which the means at the free ends of the members are of the snap-in, snap-out type operative in response to manual forces for connection, disconnection and re-connection.

3. A measuring instrument according to claim 1, in which the releasable pivot means is of the snap-in, snap-out type operative in response to manual forces for connection, disconnection and re-connection, and the means at the free ends of the members is of the snap-in, snap-out type operative in response to manual forces for connection, disconnection and re-connection.

4. A measuring instrument according to claim 1, in which at least one member is provided with longitudinal pivot means on an axis parallel to the length of the at least one the member and an elongated element parallel to said axis is carried by the pivot means selective rocking about the longitudinal pivot means relative to said at least one member, and said element bears measuring indicia and provides the straight edge on said member.

5. A measuring instrument according to claim 4, in which said at least one member is reversible from top surface to bottom surface, and the pivoted element is operative as a straight edge in either position of the said at least one member.

6. A measuring instrument according to claim 5, including detent means operative to retain the element in either position.

7. A measuring instrument according to claim 5, in which the element has a top face bearing indicia readable when the at least one member is disposed top surface up, and said element has a bottom face bearing indicia readable when the at least one member is reversed and disposed with its bottom surface up.

8. A measuring instrument according to claim 7, in which each face of the element is so shaped, when functioning as a bottom face as to have contact with a flat surface along two contact lines parallel to the longitudinal pivot axis.

9. A measuring instrument according to claim 7, in which the element is substantially V-shaped in sections through a plane normal to the longitudinal pivot axis and has upper and lower faces converging laterally outwardly to a narrow straight edge.

10. A measuring instrument according to claim 9, in which each face of the element is so shaped, when functioning as a bottom face as to have contact with a flat surface along two contact lines parallel to the longitudinal pivot axis.

11. A measuring instrument as in claim 1 wherein at least one side of at least one of the members is provided with indicia means which is moveable disposed with respect to said at least one side.

* * * * *